W. M. EWING.
MACHINE FOR MIXING CONCRETE.
APPLICATION FILED JAN. 18, 1909.

936,875.

Patented Oct. 12, 1909.
2 SHEETS—SHEET 1.

Witnesses
Inventor
William M. Ewing
By
Alexander Powell
Attorneys

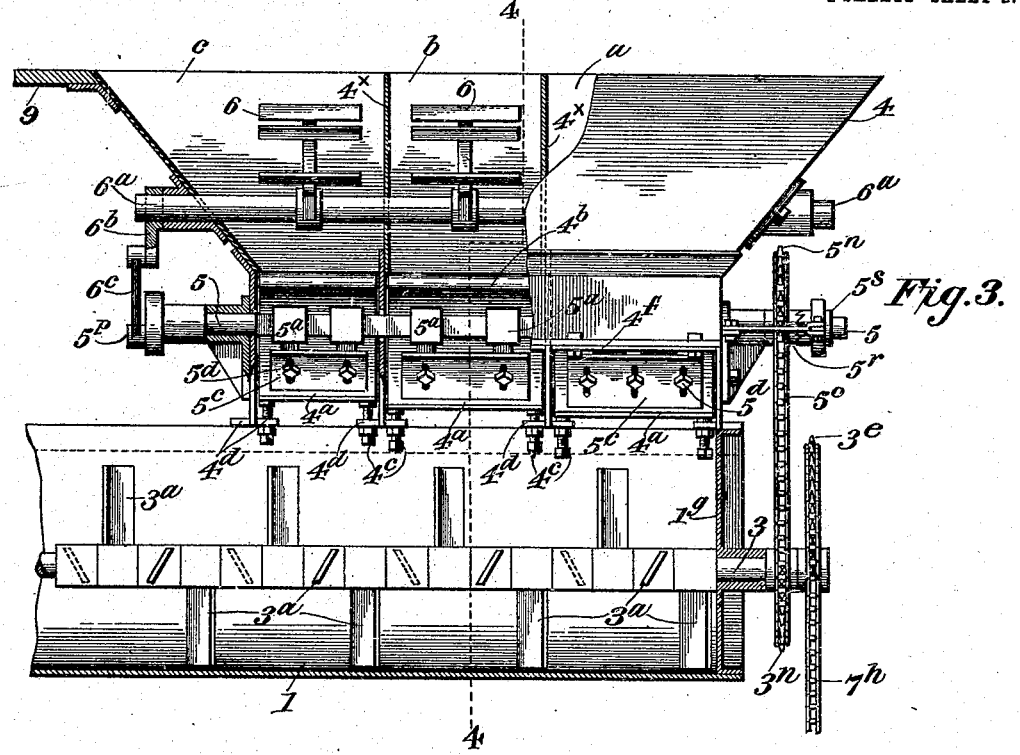

UNITED STATES PATENT OFFICE.

WILLIAM MESSENGER EWING, OF POTTSTOWN, PENNSYLVANIA.

MACHINE FOR MIXING CONCRETE.

936,875.

Specification of Letters Patent. Patented Oct. 12, 1909.

Application filed January 18, 1909. Serial No. 472,982.

*To all whom it may concern:*

Be it known that I, WILLIAM MESSENGER EWING, of Pottstown, in the county of Montgomery and State of Pennsylvania, have invented certain new and useful Improvements in Machines for Mixing Concrete; and I hereby declare that the following is a full, clear, and exact description thereof, reference being had to the accompanying drawings, which form part of this specification.

This invention is an improvement in machines for mixing concrete, and its object is to provide a portable machine whereby the ingredients of the concrete can be practically automatically measured and delivered in any desired proportions to the mixing trough, and which machine can be kept continuously in operation if desired, or the feed of materials stopped at will without stopping the mixer. And which machine can be readily transported from one point to another; and whereby the concrete can be discharged directly into the excavation or mold where it is to remain; or into suitable receivers.

The invention will be clearly understood from the accompanying drawings and the following description of the machine illustrated therein, which embodies the invention in the present preferred form,—and the parts and combination of parts for which protection is desired are summarized in the claims following the description.

Figure 1:
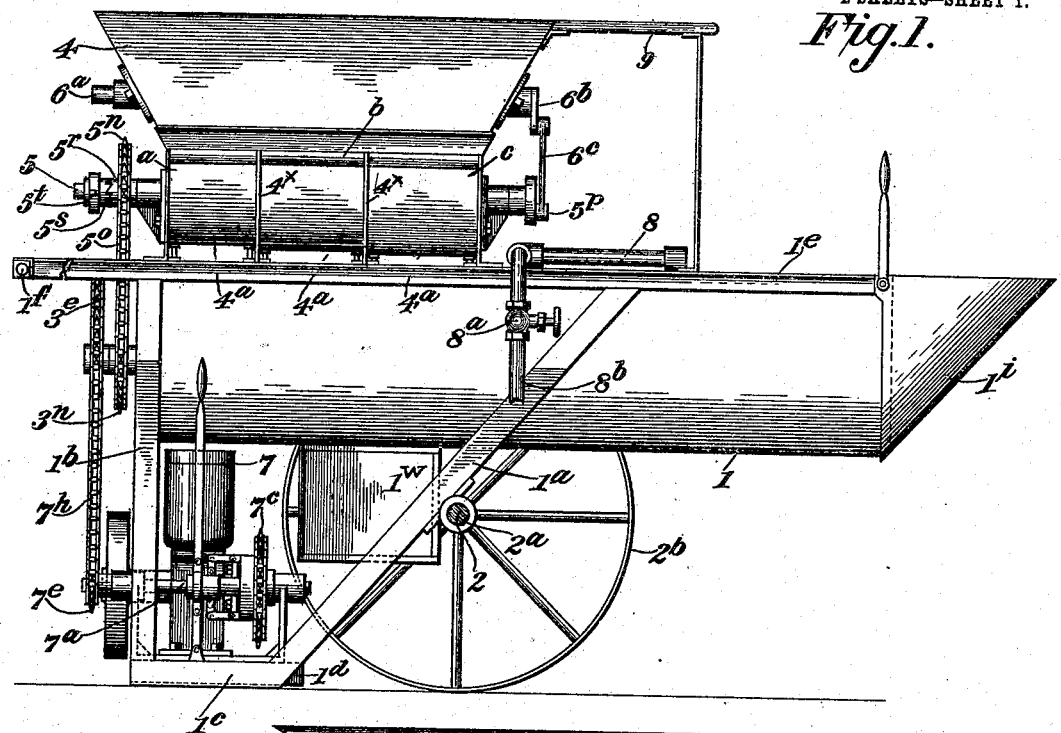
Figure 2:
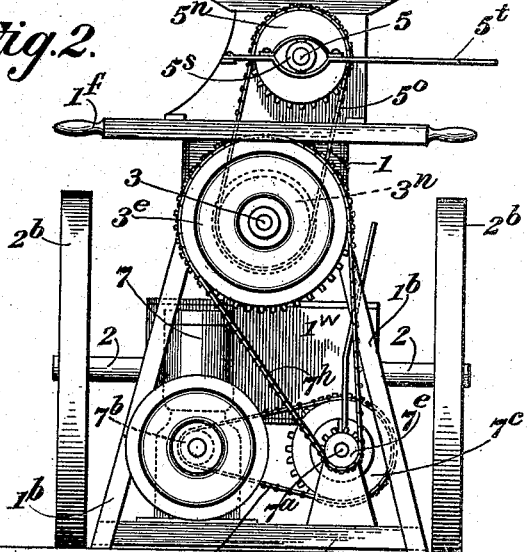

In said drawings—Figure 1 is a side view of the complete machine. Fig. 2 is an end elevation thereof. Fig. 3 is an enlarged part side elevation and part section of the hopper end of the machine. Fig. 4 is a transverse vertical section on line 4—4, Fig. 3.

The machine comprises a trough-shaped body 1, which is preferably made of sheet metal and is preferably supported upon a frame composed of legs or standards $1^a$, $1^b$, at each side, the lower ends of which are connected by pieces $1^c$ to which is secured a platform $1^d$, upon which the motor for driving the working parts is mounted. The standards $1^a$ may also be provided with bearings $2^a$, for an axle 2 having carrying wheels $2^b$ by which the machine can be supported during transport by tilting the trough sufficiently to raise the platform $1^d$ clear of the ground. The trough 1 preferably has stiffening bars $1^e$ on its upper side edges, which bars are extended beyond the receiving end of the trough, adjacent the motor platform, and are connected by a handle-bar $1^f$, by which the machine can be moved about like a push-cart.

Extending axially in trough 1 is a shaft 3 which has bearings in a plate $1^g$ closing the receiving end of the trough, and in a bracket $1^h$ attached to the other end of the trough. Upon this shaft 3 within the trough are mounted a series of radially disposed blades $3^a$, which may be of any suitable construction, adapted to mix the material in the trough and to move it therein from the receiving end to the discharge end thereof. The trough 1 and shaft 3 and blades $3^a$ constitute the mixer for the concrete materials. The discharge end of the mixer trough may be provided with a hinged gate $1^i$, which can be closed when desired to stop delivery of concrete from the mixer; and when the machine is being moved from one point to another.

Above the mixer is a means for feeding and measuring the materials for the concrete; said means being preferably as follows: A hopper 4 is supported on the receiving end of trough 1 and is divided into three compartments $a$, $b$, $c$, by two interior partitions $4^x$. The compartment $a$ may be used for stone; compartment $b$ for sand; and compartment $c$ for cement. Each compartment has a bottom plate $4^a$ which is adjustable; preferably such bottom is hinged at one side, as at $4^b$, and is curved at its hinged side on the arc of a circle substantially concentric with a shaft 5, that extends through the several compartments; and at the side opposite the hinge, and below the shaft, the free end of the bottom is supported upon adjustable bolts $4^c$ tapped through suitable supports, as lugs $4^d$ on the lower edges of the end walls and partitions. An opening $4^e$ at the side of the hopper opposite the hinge $4^b$, and above the bottom, permits discharge of material, and at the upper edge of said opening is an adjustable plate $4^f$, which is provided with a slot through which passes a bolt $4^h$ engaging a lug or flange $4^g$ attached to the side wall of the hopper, as shown. The plate $4^f$ can be adjusted horizontally to and from shaft 5, and forms with the underlying portion of the bottom 4$^a$ a chute through which material is ejected from the compartment into the mixer.

Material can be ejected from each compartment by means of a rotary pusher therein; which preferably comprises a slotted plate 5$^c$ fastened by a bolt 5$^b$ to an arm 5$^a$ on shaft 5, the slot and bolt permitting the pusher-plate to be adjusted toward or from the shaft so as to traverse a greater or less circle, and consequently eject more or less material from the compartment. If plate 5$^c$ is moved inwardly nearer the shaft 5, less material will be ejected thereby; and if it is moved outwardly it can eject more material. The plate 4$^f$ is adjusted in or out, according to the position of pusher plate 5$^c$, so that the outer edge of plate 5$^c$ will pass close to the inner edge of plate 4$^f$, and the material moved by pusher 5$^c$ will pass out under plate 4$^f$ and escape through opening 4$^e$ into the mixing trough. The pusher 5$^c$ is adjusted so that at the descending side of the shaft it traverses close to the curved portion of the bottom 4$^a$. The pusher 5$^c$, and regulating plate 4$^f$, are adjusted according to the position or adjustment of the discharge end of the bottom 4. The pusher 5$^c$ is preferably set at an angle, or tangential to shaft 5, instead of radially thereto, so that it will operate more effectively to push the material forward under plate 4$^f$, as the pusher rises toward and past plate 4$^f$. This inclination of the pusher also causes it to force the material outwardly against the bottom of the hopper, and not carry it around in a circle. The bottom 4, plate 4$^f$, and pusher 5$^c$, are made adjustable, in order that the different materials, (sand, stone, cement, etc.) in the several hoppers—can be fed in the desired quantities, to produce the desired kind of concrete. The bottom of hopper will be held down upon the set screws by gravity. There is a like arrangement of pusher and regulating plate in each compartment.

Each compartment 4 is preferably hopper-shaped as shown, and in each is mounted an agitator 6, fast to a shaft 6$^a$, extending through the several compartments above shaft 5. On one end of shaft 6$^a$ is an arm 6$^b$ connected by a link 6$^c$ to an eccentric pin 5$^p$ on the adjacent end of shaft 5, as shown, so that the agitators can be rocked during the rotation of shaft 5. The shaft 5 can be rotated at the desired speed, and in proper direction to feed the material by any suitable means; as shown a sprocket 5$^n$ on shaft 5 is driven by a chain 5$^o$, from a sprocket 3$^n$ on shaft 3. Sprocket 5$^n$ may be loose on shaft 5, and provided with a clutch 5$^r$ on one end of its hub, adapted to be engaged by a clutch member 5$^s$ splined on shaft 5, and which can be thrown into or out of engagement with the sprocket clutch 5$^r$ by a clutch lever 5$^t$, so that the feed of material can be started or stopped at will, without stopping the mixing shaft 3.

Upon the platform 1$^c$ is mounted a motor 7 of any suitable type, preferably an explosive engine. I prefer to use a high speed gasolene engine. This engine drives a countershaft 7$^a$ by means of pulleys 7$^b$, 7$^c$, and a belt or sprocket chain 7$^d$, by which the speed of the engine is materially reduced. The shaft 3 is driven from countershaft 7$^a$ by means of pulleys 7$^e$, 3$^e$, and a belt or sprocket chain 7$^h$, by which the speed of the mixer shaft is materially reduced.

Water is supplied to the materials in the mixer by means of a spray-head 8 attached to the trough and provided with a valve 8$^a$ and a hose connection 8$^b$.

The tank for gasolene or oil, and the batteries for the igniter, may be conveniently placed in a box 1$^w$ mounted on the frame, under the trough 1, as shown. And a platform 9 may be arranged beside the hopper to support the bags of cement while filling hopper.

Operation: The machine can be readily moved like a push-cart to any desired point, and the compartments of the hopper are respectively filled with broken stone, sand, and cement; and the bottoms 4$^a$, pushers 5$^a$ and plates 4$^f$ are adjusted to regulate the feed of the materials as desired.

When the machine is in operation the movement of the pushers in the hopper compartments will cause the desired amounts of the different materials to be discharged into the mixer, wherein they are thoroughly commingled by the blades 3$^a$, and suitably moistened and eventually discharged from the mixer past the gate.

The discharge end of the mixing trough can be readily adjusted into position over an excavation or mold so that the mixed concrete will be discharged directly from the trough thereinto; thus materially expediting the work. The machine can of course be used to mix concrete and discharge it from the trough into barrels or other suitable receivers.

The desired proportions of the material for concrete of any given strength, can be obtained by properly adjusting the bottom 4, pushers 5$^c$, and plates 4$^f$, as above described.

Having described my invention what I desire to secure by Letters Patent thereon is:

1. In a concrete mixing machine, the combination of a feed hopper having a discharge opening at one side, an adjustable bottom plate for varying the size of the discharge opening, a shaft above the bottom plate and at one side of the discharge opening, and a tangentially disposed pusher adjustably attached to said shaft.

2. In combination, a feed hopper having a discharge opening at one side, a shaft extending through the hopper at one side of said opening, an adjustable pusher attached to the shaft, a bottom plate curved at its end adjacent the shaft and extending to said opening, and an adjustable plate parallel with the bottom plate and located at the upper edge of the discharge opening.

3. In combination a feed hopper having a discharge opening at one side, a shaft extending through the hopper, a tangentially disposed pusher adjustably connected to said shaft, a hinged bottom plate curved at its rear side, and means for adjusting the forward end of the plate under the discharge opening, and an adjustable plate at the upper edge of the discharge opening.

4. In a concrete mixing machine, a feed hopper having a plurality of compartments each having a discharge opening at one side, means for varying the size of each discharge opening, and a rotatable pusher within each compartment and at the inner side of the discharge opening, substantially as described.

5. In a concrete mixing machine, a feed hopper having a series of compartments each provided with a discharge opening, and an adjustable bottom plate for varying the size of the discharge opening; a shaft extending through the several compartments above the bottom plates, and a tangentially disposed pusher attached to said shaft in each compartment.

6. In combination, a feed hopper having a series of compartments provided with discharge openings at one side, a shaft extending transversely through the compartments at one side of said openings, an adjustable pusher attached to the shaft in each compartment, a bottom plate for each compartment curved at one end adjacent the shaft and flattened at the discharge end, and an adjustable plate at the upper edge of each discharge opening.

7. In a concrete mixing machine, the combination of a feed hopper having a series of compartments, each having a discharge opening at one side, a shaft extending through the compartments, arms on said shaft, tangentially disposed pusher plates adjustably connected to said arms, a hinged and curved bottom plate for each compartment, means for adjusting the end of the plate adjacent the discharge opening, and an adjustable plate at the upper edge of each discharge opening.

8. In a concrete mixing machine, the combination of a trough, a shaft extending through said trough, stirrer blades attached to said shaft, and means for driving said shaft; with a hopper having a series of compartments provided with discharge openings, an adjustable bottom plate for varying the size of each discharge opening, a shaft extending through the compartments, adjustable pushers attached to said shaft, and means for driving the pusher shaft from the mixer shaft.

9. In a concrete mixing machine, the combination of a trough, a shaft extending through said trough, blades attached to said shaft, and gearing for driving said shaft; with a feed hopper above the trough having a series of compartments each having a discharge opening at one side, a shaft extending through the compartments, tangentially disposed pusher plates connected to said shaft, a hinged bottom plate for each compartment, means for adjusting the plate adjacent the discharge opening, an adjustable plate at the upper edge of each discharge opening, and means for driving the pusher shaft from the mixer shaft.

10. In a concrete mixing machine, the combination of a trough, a frame supporting said trough, a motor mounted on said frame below the trough, a shaft extending through said trough, blades attached to said shaft, and gearing for driving said shaft from the motor; with a hopper having a series of compartments provided with discharge openings, an adjustable bottom plate in each compartment for varying the size of the discharge opening, a shaft extending through the compartments above the bottom plates, adjustable pushers attached to said shaft, and means for driving the pusher shaft from the mixer shaft.

In testimony that I claim the foregoing as my own, I affix my signature in presence of two witnesses.

WILLIAM MESSENGER EWING.

Witnesses:
HORACE D. SMITH,
ELMER E. KOEHLER.